United States Patent
Krauss et al.

(10) Patent No.: US 6,393,868 B1
(45) Date of Patent: May 28, 2002

(54) PROCESS FOR THE PRODUCTION OF SEQUENCES OF INTERFACE LAYERS

(75) Inventors: Manfred Krauss, Jena; Hans-Georg Krolla, Mainz; Eckart Hussmann, Ober-Olm; Bernhard R. Durschang; Gerd Muller, both of Würzburg, all of (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 0 days.

(21) Appl. No.: 09/420,560

(22) Filed: Oct. 19, 1999

(30) Foreign Application Priority Data

Oct. 19, 1998 (DE) .......................... 198 48 083

(51) Int. Cl.⁷ .............................................. C03B 13/10
(52) U.S. Cl. ................................... 65/23; 65/54; 65/38
(58) Field of Search ........................... 65/37, 38, 39, 65/40, 41, 403, 404, 53, 54, 23

(56) References Cited

U.S. PATENT DOCUMENTS

| | | | | | |
|---|---|---|---|---|---|
| 2,565,941 A | * | 8/1951 | Barnard | ......................... | 65/33 |
| 3,004,368 A | * | 10/1961 | Hicks | ......................... | 65/411 |
| 3,455,667 A | * | 7/1969 | Snitzer | ......................... | 65/38 |
| 3,535,537 A | * | 10/1970 | Powell | ......................... | 65/37 |
| 3,684,468 A | * | 8/1972 | Bode | ......................... | 65/38 |
| 3,879,182 A | * | 4/1975 | Strack | ......................... | 65/37 |
| 3,899,315 A | * | 8/1975 | Siegmund | ......................... | 65/23 |
| 3,980,461 A | * | 9/1976 | Moeckel | ......................... | 65/403 |
| 4,071,343 A | * | 1/1978 | Siegmund | ......................... | 65/23 |
| 4,099,835 A | * | 7/1978 | French | ......................... | 65/415 |
| 4,175,940 A | * | 11/1979 | Siegmund | ......................... | 65/28 |
| 4,204,851 A | * | 5/1980 | Nolan | ......................... | 65/421 |
| 4,231,775 A | * | 11/1980 | Siegmund | ......................... | 65/403 |
| 4,465,336 A | * | 8/1984 | Huber | ......................... | 65/403 |
| 4,494,968 A | * | 1/1985 | Bhagavatula | ......................... | 65/421 |
| 5,236,486 A | * | 8/1993 | Blankenbeeler | ......................... | 65/37 |
| 5,279,634 A | * | 1/1994 | Cognolato | ......................... | 65/417 |
| 5,582,626 A | * | 12/1996 | Blankenbecker | ......................... | 65/38 |
| 5,702,497 A | * | 12/1997 | Oh | ......................... | 65/412 |

FOREIGN PATENT DOCUMENTS

| | | |
|---|---|---|
| DE | 42 25 357 A1 | 2/1994 |
| EP | 0 634 458 A1 | 1/1995 |
| EP | 0 742 262 A2 | 11/1996 |

* cited by examiner

*Primary Examiner*—John Hoffman
(74) *Attorney, Agent, or Firm*—Venable; Robert Kinberg; Ashley J. Wells

(57) ABSTRACT

The present invention relates to a novel process for the production of sequences of interference layers composed of layers i of prescribed thicknesses $d(i)$ and refractive indices $n(i)$. In this process a stack of at least two layers i of glasses having refractive indices $n(i)$ and thicknesses $d_0(i)$, which are each larger than the predetermined thicknesses $d(i)$ by the same multiplying factor, is provided. The stack is heated to a temperature above the transformation temperature of the glasses and during or after heating, the stack is drawn in such a manner that the individual layers obtain the prescribed thicknesses $d(i)$. After this the drawn stack is cooled.

6 Claims, 11 Drawing Sheets

SECTION A-A

SECTION A-A

Figure 1:
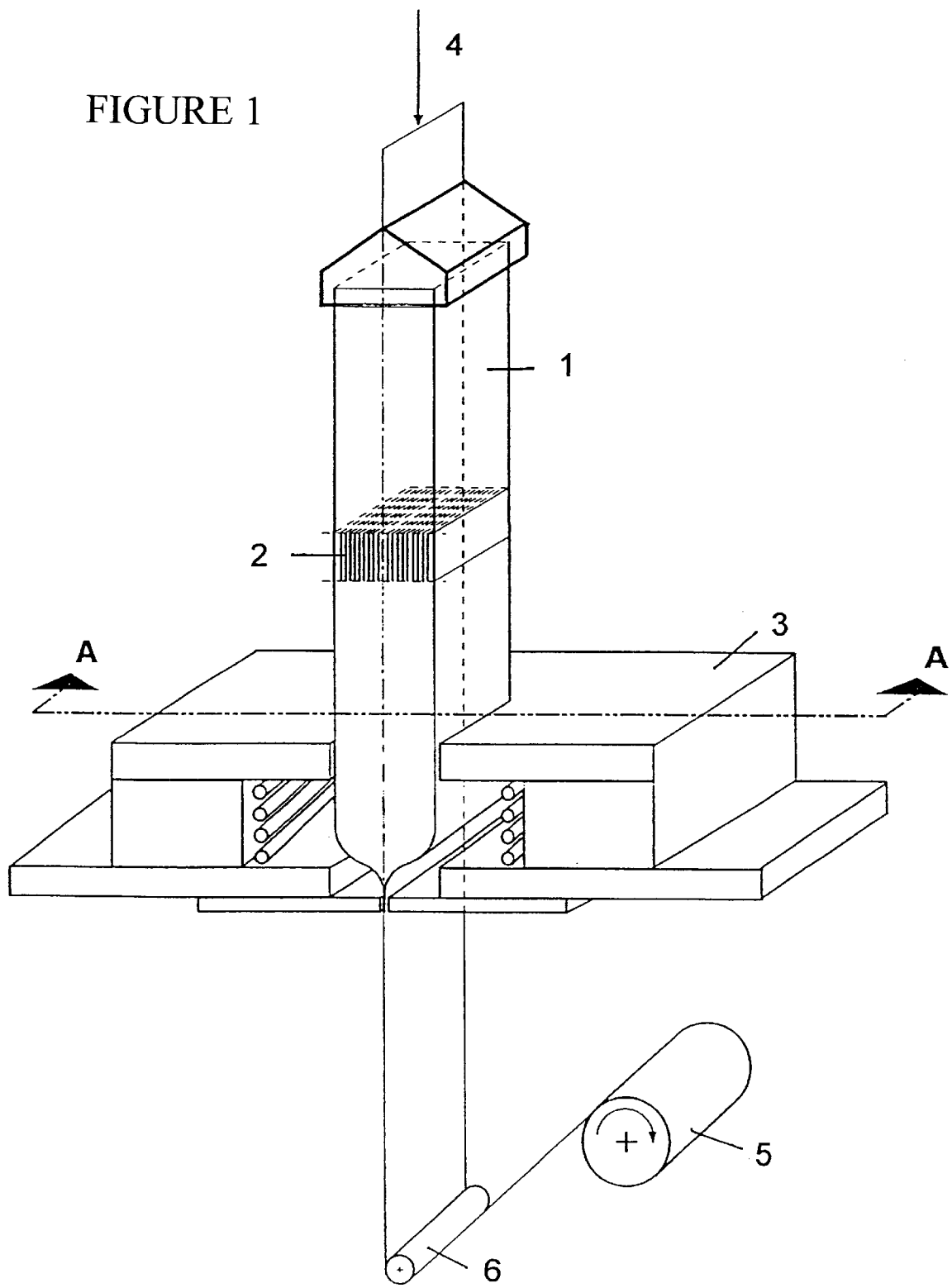

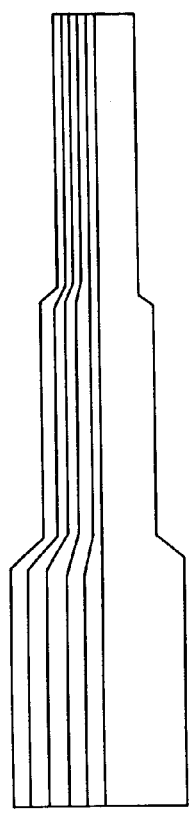
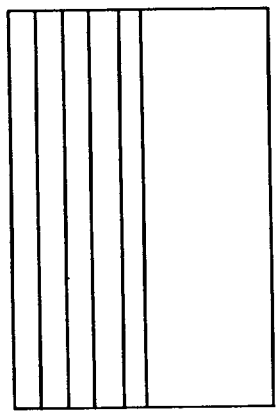
FIG. 13a
DRAWING WITH DRAWING VELOCITY VARIED IN STEPS
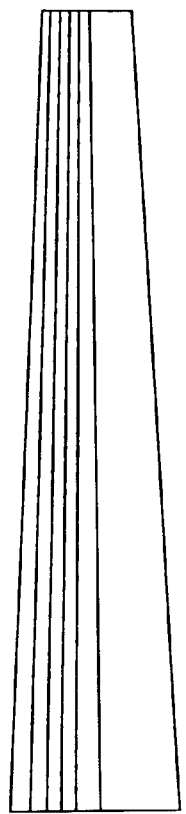
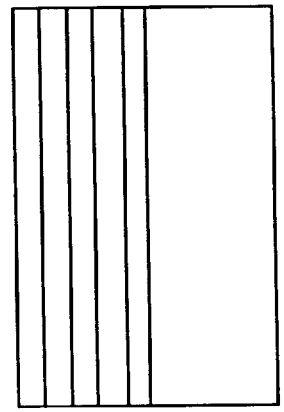
FIG. 13b
DRAWING WITH DRAWING VELOCITY VARIED CONTINUOUSLY

PROCESS FOR THE PRODUCTION OF SEQUENCES OF INTERFACE LAYERS

BACKGROUND OF THE INVENTION

1. Field of the Invention

The present invention relates to a novel process for the production of sequences of interference layers. The invented process permits the production of interference layer systems of varying buildup, which can be used in a large variety of applications. These interference layers systems are suited, in particular, as filters, as interference pigments or as particles to be embedded in documents to prevent counterfeiting.

2. Description of the Related Art

Interference layer systems are composed of any desired number of layers having at least two different refractive indices and layer thicknesses, which are usually smaller than the respective light wavelengths. The interference layers are employed particularly as antireflex layers, reflection layers, interference pigments, beam splitters, edge filters, line filters and minus filters.

There are a number of processes known for producing interference layer systems. These processes are usually coating processes. Thus, chemical processes, such as for instance sol-gel coating processes, spraying processes, surface-reduction processes or CVD (chemical vapor deposition), as well as physical processes, such as for instance vaporization processes or sputtering, can be employed to produce interference layers. A large palette of high-refractive-index and low-refractive-index materials is available as coating and substrate materials.

Interference pigments for mother-of-pearl or metal glaze in lacquers, paints or cosmetics are predominantly produced by coating small platelike mica crystals with $TiO_2$ or other metal oxides (cf. e.g. U.S. Pat. Nos. 3,553,001 or 3,331,699). Carbon-containing layers and basic organic dyes are also applied as coatings (cf. e.g. EP-0634458 or DE 4225357). Small mica plates with a diameter of 100 to 500 $\mu m$ and a thickness of 0.1 to 10 $\mu m$ painstakingly gained from natural mica, with a yield of less than 10%, are used as substrates. Other materials are also employed as substrates for interference coatings, such as for example $PBSO_4$, small hexagonal $Fe_2O_3$ plates (diameter 5 to 50 $\mu m$) and graphite. U.S. Pat. No. 5,436,077 also describes the use of small glass particles as a substrate on which a metal layer and a covering protective layer are deposited. However, mica-based mother-of-pearl and metal glaze pigments are most common and have more than 80% of the market.

The state of the art also describes-coating organic substrates with $TiO_2$ or $ZrO_2$ (cf. ZA-6 805 748) or coating preformed polyester-resin-based organic parts of molds (cf. EP-742 262) in order to produce interference pigments. However, the thermal and mechanic stability of these interference pigments generally do not meet the needed requirements.

A drawback of all the known processes and coating materials is the unsatisfactory precision in obtaining the refractive index and thickness of the layers so that the desired interference effect is often not achieved. Especially the refractive index is met only very inadequately due to the employed coating methods. Moreover, the production of sequences of interference layers is very complicated and requires many different process steps, each of which can harbor errors and increase the expense of the entire process. Furthermore, with these processes and materials, a large amount of the layer-forming materials is lost.

Moreover, the layers of the interference layer systems made with these conventional production processes cannot be obtained completely poreless so that the spectral properties may change as water vapor and other gases collect in the pores of the filter. Upon warming up, the gas charge of this interference layer system changes again so that the spectral properties, such as reflection and transmission, vary. In the most unfavorable conditions, e.g. due to environmental influences, the applied coating may also detach from the substrate.

U.S. Pat. No. 3,711,176 describes another process for the production of sequences of interference layers. In this process, high-reflective-index colored plastic films are made from multiple transparent, thermoplastic plastic layers by means of simultaneous extrusion. However, the resulting layer system is usually only suited for obtaining special optical effects on the surfaces due to the inadequate precision in attaining the refractive indices and the layer thicknesses. Moreover, the variation range of the refractive indices of the thermoplastics is only small, which greatly limits the ability to produce a selected interference effect. Moreover, the employed materials are not very thermally, mechanically, chemically or environmentally, e.g. UV radiation, resistant.

The object of the present invention is to provide a process for the production of a sequence of interference layers which permits producing precise and durable interference layer systems at low costs. Furthermore, to provide a sequence of interference layers producible thereby.

BRIEF SUMMARY OF THE INVENTION

The object is solved by providing a process for the production of one of interference filters, interference pigments or interference particles having sequences of interference layers composed of layers i of prescribed thicknesses d(i) and refractive indices n(i), comprising the steps of providing a stack of glass plates having plane surfaces, the stack comprised of at least two layers i of glasses having refractive indices n(i) and thicknesses $d_0(i)$, which are each larger than the prescribed thicknesses d(i) by the same multiplying factor; heating the stack to a temperature above the transformation temperature of the glasses of the layers; drawing the stack during or after heating in such a manner that the respective layers obtain the prescribed thicknesses d(i); and cooling of the drawn stack.

The object is solved by means of the process according to claim 1 and the sequence of interference layers according to claim 18. Advantageous embodiments of the process are the subject matter of claims 2 to 16. An intermediate product, which is obtained in one embodiment of the process is set forth in claim 17.

The invented process permits precise and inexpensive production of sequences of interference layers of multiple layers i of prescribed thicknesses d(i) and refractive indices n(i), for example a layer sequence of layers 1 (i=1) and 2 (i=2) of varying thicknesses d(1), d(2) and varying refractive indices n(1) and n(2).

An element of the present invention is that it was understood that the production of such a type of sequence of interference layers cannot be realized using conventional coating methods or materials but rather in a very advantageous manner by using glass as the layer material in conjunction with the following process steps.

In this process, first a stack of at least two glass layers i composed of different glasses respectively types of glass, with the same refractive indices n(i) and the same layer sequence as in the to-be-produced sequence of interference layers, are provided. The thicknesses $d_0(i)$ of the layers of the stack are selected in such a manner that they are always larger by the same factor than the prescribed thicknesses $d(i)$ of the layers of the to-be-produced interference sequence. These parameters can be met in an excellent manner, in particular, with glass materials. The stack is finally heated to a temperature above the transformation temperature of the glasses of the layers and subsequently or simultaneously drawn in such a manner that the individual layers reach the prescribed thicknesses $d(i)$. After this the drawn stack is cooled.

Strikingly, when drawn, the individual glass layers do not melt together in such a manner that they lose their original properties. But rather, both the refractive indices and the layer thicknesses ratio are exactly retained even in the case of large surface layers. The layers melt together only where they touch thereby creating a very advantageous strong bond between the individual precisely defined layers.

In a preferred embodiment of the invented process, the stack is provided as a so-called "preform". This preform comprises a stack of glass plates whose refractive indices $n(i)$ and thicknesses $d_0(i)$ are suitably selected according to the aforementioned conditions. The preform is drawn at temperatures above the transformation temperature in such a manner that the glass plates melt together where they touch and the thicknesses of the individual glass plates are reduced to the desired thickness. In simple words, one could say that the starting stack, in the invented process the preform, undergoes a similarity transformation, with the starting thicknesses $d_0(i)$ and the starting widths $b_0(i)$ being reduced by a constant factor while retaining the refractive indices. The area (parallel to the layering) yielded after drawing is enlarged by this factor. Setting the prescribed thicknesses $d(i)$ preferably occurs via the drawing velocity. This can be exactly precalculated for each desired thickness reduction. The optical thicknesses $n(i) \cdot d(i)$ of the individual glass plates i are usually selected in such a manner that, depending on the desired interference effect, $\lambda/4$-layers or multiples thereof are created.

In another embodiment of the invented process, the drawing velocity is altered step by step or continuously during drawing. In this manner, successive interference layer sequences of varying thicknesses, i.e. with different spectral properties, are created from a single stack. In the case of continuously increase of the drawing velocity, a sequence of interference layers with continuously changing layer thicknesses along the drawing length (sequence of graded interference layers) can also be produced.

Alternatively, the provided stack for producing a graded interference filter can also have an already prescribed gradient thickness of the layers transverse to the drawing direction. Drawing then can occur at a constant rate.

In an advantageous embodiment, the preform subject to the drawing step is itself already composed of multiple single preforms each containing a stack of layers of a single sequence of interference layers respectively. The individual preforms are separated by intermediate layers of soluble thermoplastic materials, preferably glass. Soluble materials in this context refers to materials of the layers that are soluble, for instance, in an aqueous or an acidic solution which does not dissolve the glasses of the other layers. Examples of such material/solvent combinations are borosilicate glasses that are soluble in a weak acidic medium. After the drawn preform has cooled, the intermediate layers are dissolved in the suited solvent in such a manner that the individual sequences of interference layers are separated. The separation glasses of the intermediate layers can be applied by means of powder technology or screen-printing processes. This is also the case for the layers of the interference layer systems. For the preform, preferably either high-refractive-index or low-refractive-index glass is provided as thin glass and the respective other glass is applied onto it by means of screen printing or powder technology. The glass applied as frit has to be transformed into a transparent, homogeneous layer by means of thermal treatment. This can occur before assembling the individual layers to form a preform or at the same time as the melting together of the individual layers of the preform prior to the drawing procedure. Dependent on the flow behavior of the frit paste, it may be necessary to apply several layers per screen printing in order to obtain the required thickness.

This possible method of production of the preform is, of course, not limited to this preferred embodiment.

In the case of large starting layer thicknesses $d_0(i)$, it may be necessary to carry out the drawing procedure in several steps. In this event, between the individual steps, differently or similarly layered packages of glass can be added to the layered package. The stack can, for instance, be separated into several longitudinal sections following one drawing step. These sections are placed one on top of the other to form a new stack which for its part undergoes the remaining drawing steps.

In another advantageous embodiment of the invented process, the stack is wound around a drum during the drawing step. In this way, several layers of the stack come to lie on top of each other. This multi-layer system is then divided into one or several sections and at least one of the sections, as a new stack, undergoes the remaining steps.

For better handling, the stack can be applied between two steps onto a carrier plate made of thermoplastic material, in particular glass or plastic, and undergoes the remaining steps with this carrier plate. The carrier plate can already be connected to the stack prior to starting the first drawing step. In the event that the carrier plate is not needed for stabilization of the produced sequence of interference layers after termination of the drawing step, the material of the carrier plate can be selected of a soluble material, such as was selected for the intermediate layers so that the carrier plate can be dissolved in a solvent.

Following cooling, the drawn stack can, if need be, be separated mechanically into individual particles or sections. For the production of interference pigments, this mechanical separation can, for example, occur using a cutting mill.

Possible glass materials are oxidic and non-oxidic glasses. The choice of types of glass should be such that, in addition to the refractive indices, compatibility of the glasses with regard to thermal drawing coefficients and interdiffusion as well as resistance to environmental influences are taken into account.

The entire drawing process occurs using a similar technique as employed in drawing optical light guide fibers. Surprisingly, such a process can also be applied to the present packages of glass plates in such a manner that after the drawing process, glass ribbons of defined glass layers are created. The individual glass layers can be produced with utmost precision with regard to thickness and refractive index in such a manner that the desired interference behavior can be obtained. The changes in reflection, transmission, absorption and polarization of an electromagnetic wave in the optical spectral range (UV, visible spectral range, IR) upon impinging upon the invented interference systems can be defined and set precisely. The interference systems produced in this manner are composed of firmly melted together layers of glass. There are no pores in the layers, and the layers adhere to each other extremely well. Consequently, the interference systems produced according to the present invention do not undergo any changes in their spectral properties after the production process. With the suited selection of glasses facing outward, resistance to most environmental influences of the interference systems is extremely good. They are transparent and UV-resistant.

Although the available range of high-refractive-index and low-refractive-index, oxidic and non-oxidic glasses is smaller than is the case with materials that are employed for the traditional coating processes. However, glasses with almost every refractive index between the extreme value $n_d=1.437$ and $n_d=$approx. 3.2 are known. For the invented purposes, glasses that are in normal use, i.e. with greater thicknesses, not transparent but transparent in the invented layer thicknesses can also be employed.

It is a particular advantage that the refractive indices of the used starting glasses can be met more precisely by several orders of magnitude compared to conventional coatings. The same holds for the layer thicknesses.

Furthermore, it is advantageous that the invented process permits producing interference systems with very many layers in a simple manner, because the most important step of the process, the drawing procedure, is for the most part independent of the number of glass plates of which the preform is composed.

Another, especially economical advantage is that the employed materials are practically completely utilized in making the interference layer system.

In some applications, an inherent advantage of the present invention can be exploited by making parts of the "ribbon" being produced with varying thickness during the final drawing procedure. This can, as already explained, be realized by means of different drawing velocities. The interference systems being produced then all possess the same layer sequence, but different thicknesses, which leads to shifting the position of the spectral distribution of the interference system. Thus, for example, in the case of line filters, the spectral position of the greatest transmission range shifts.

Suited selection of the number of layer sequences, refractive indices and layer thicknesses permits obtaining any desired spectral distribution of reflection respectively transmission of the interference system.

Figure 2:
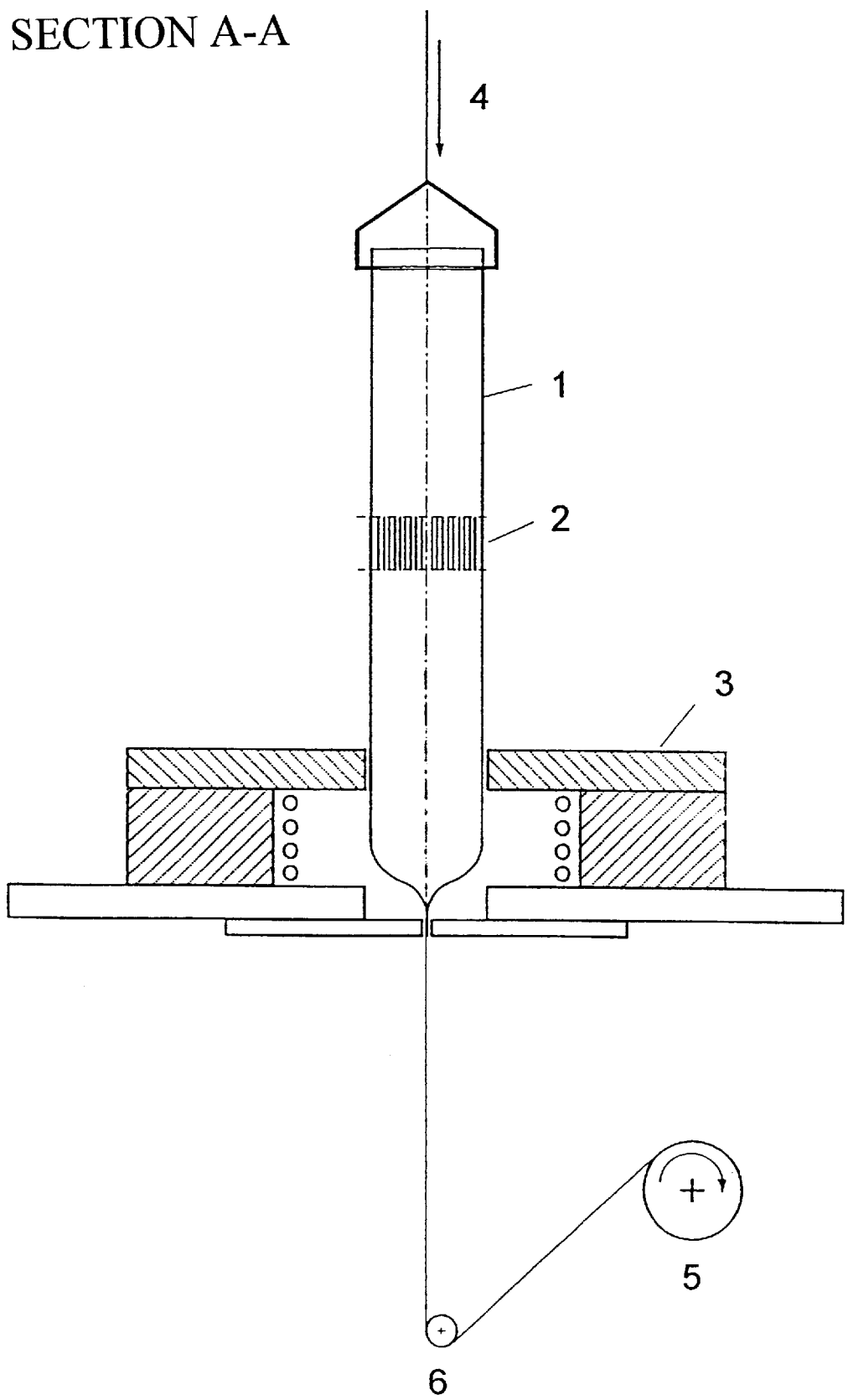
Figure 3:
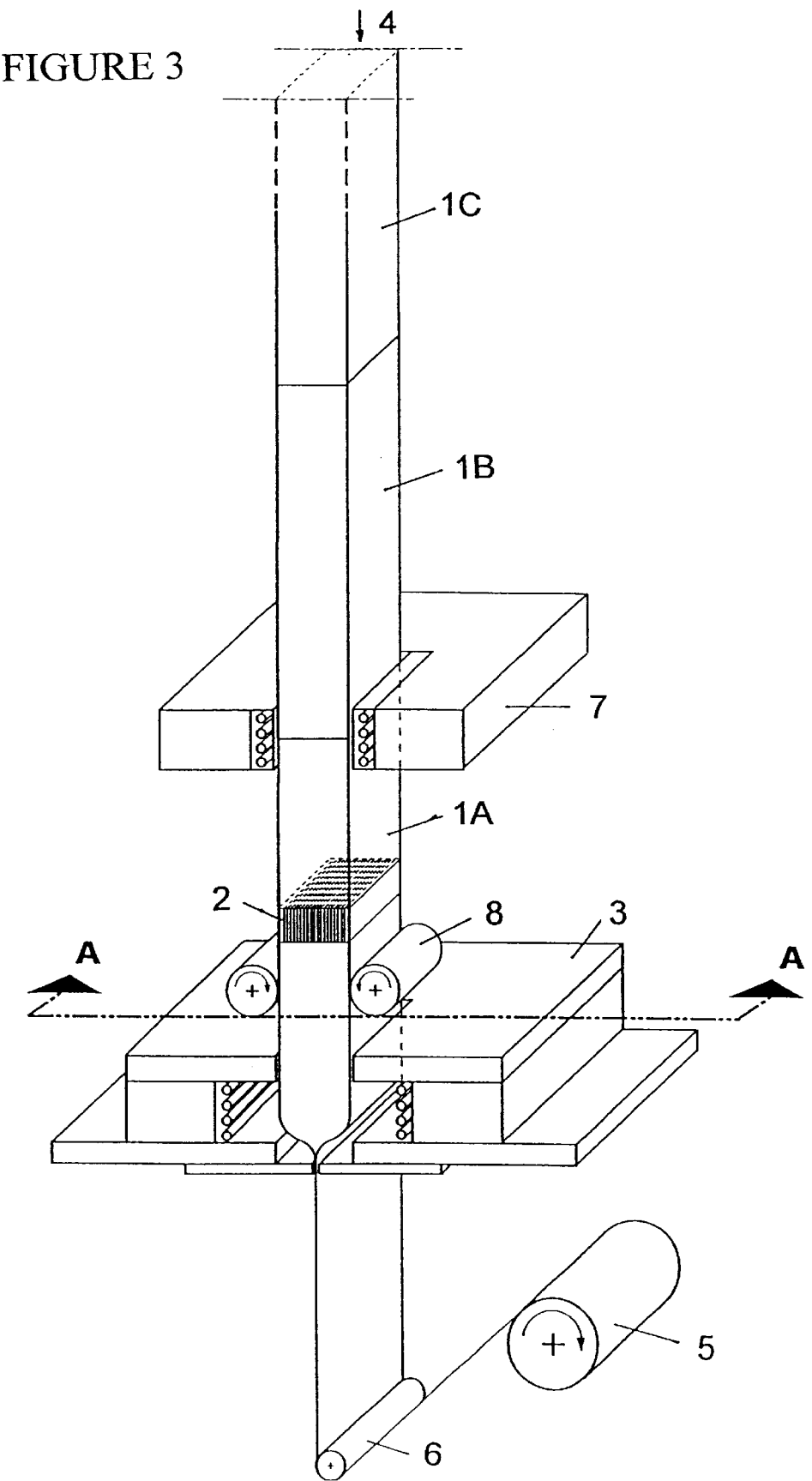
Figure 4:
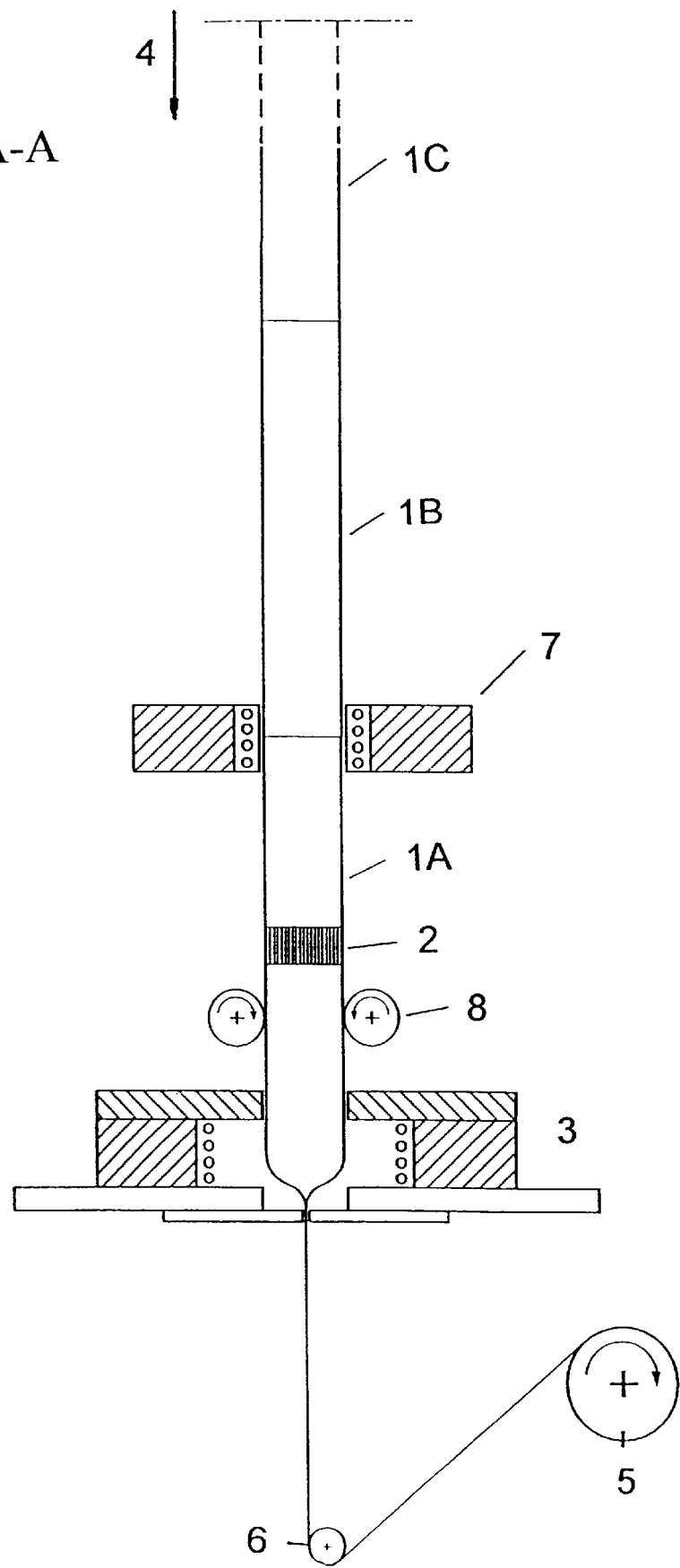
Figure 5:
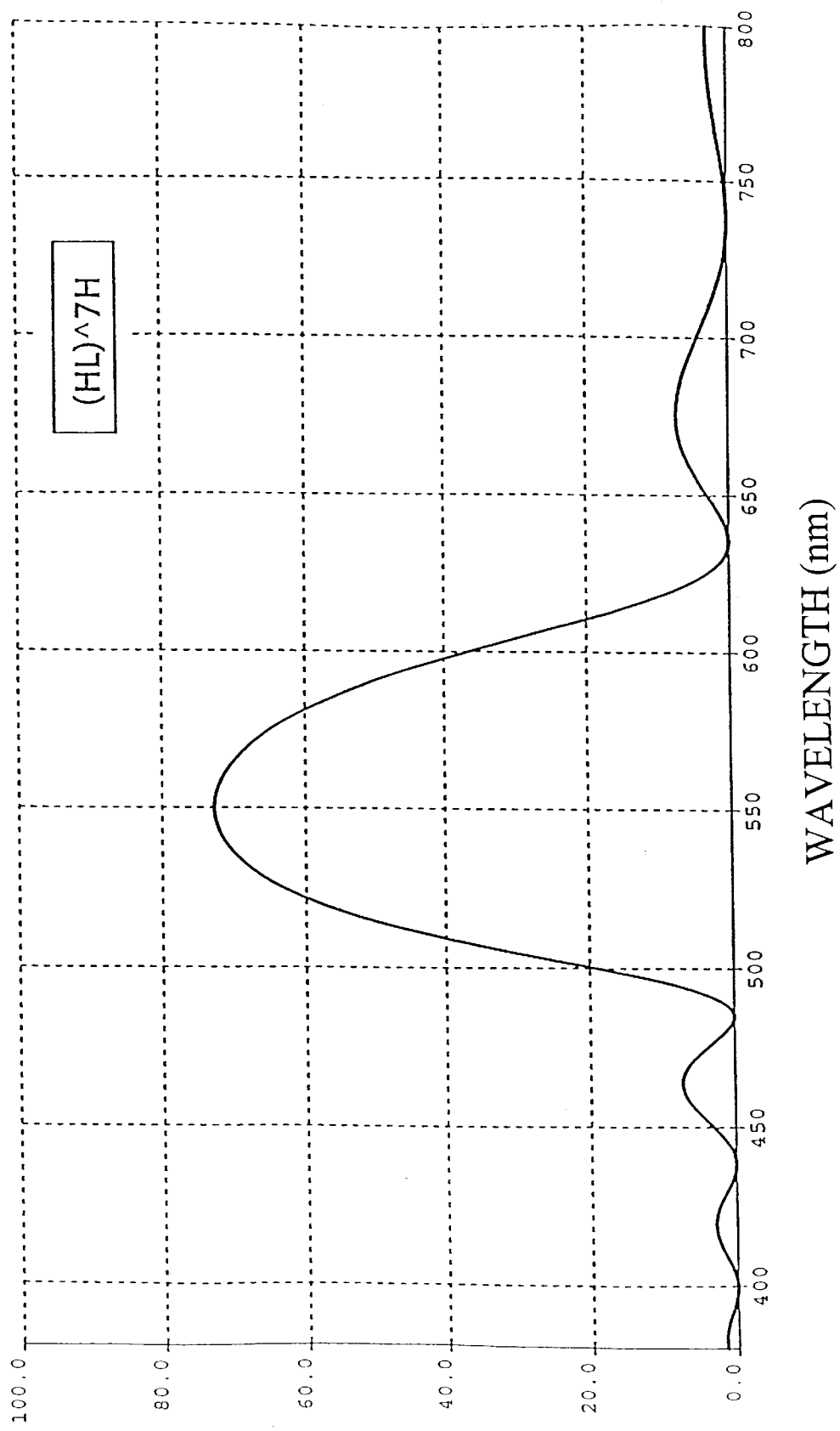
Figure 6:
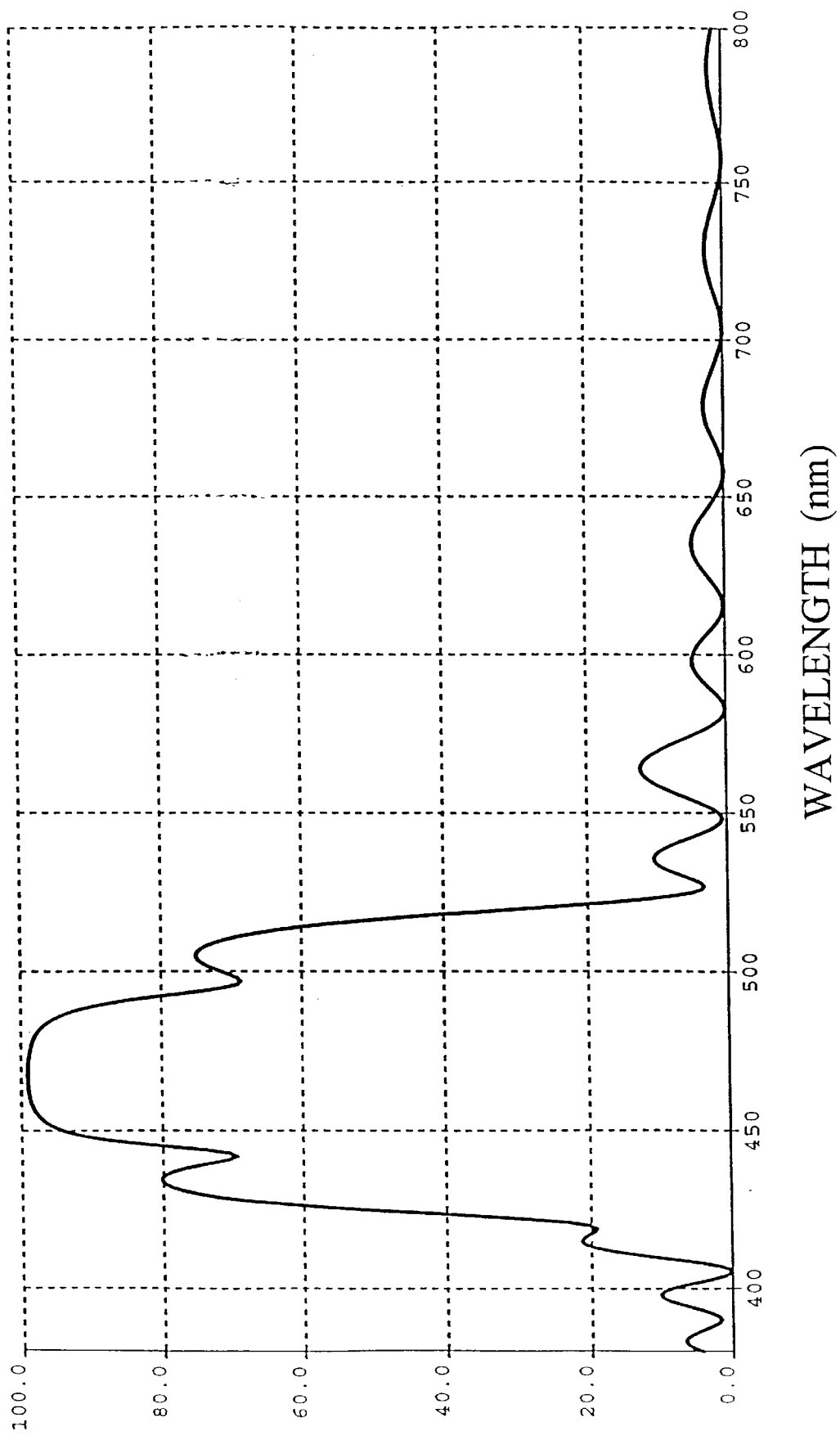
Figure 7:
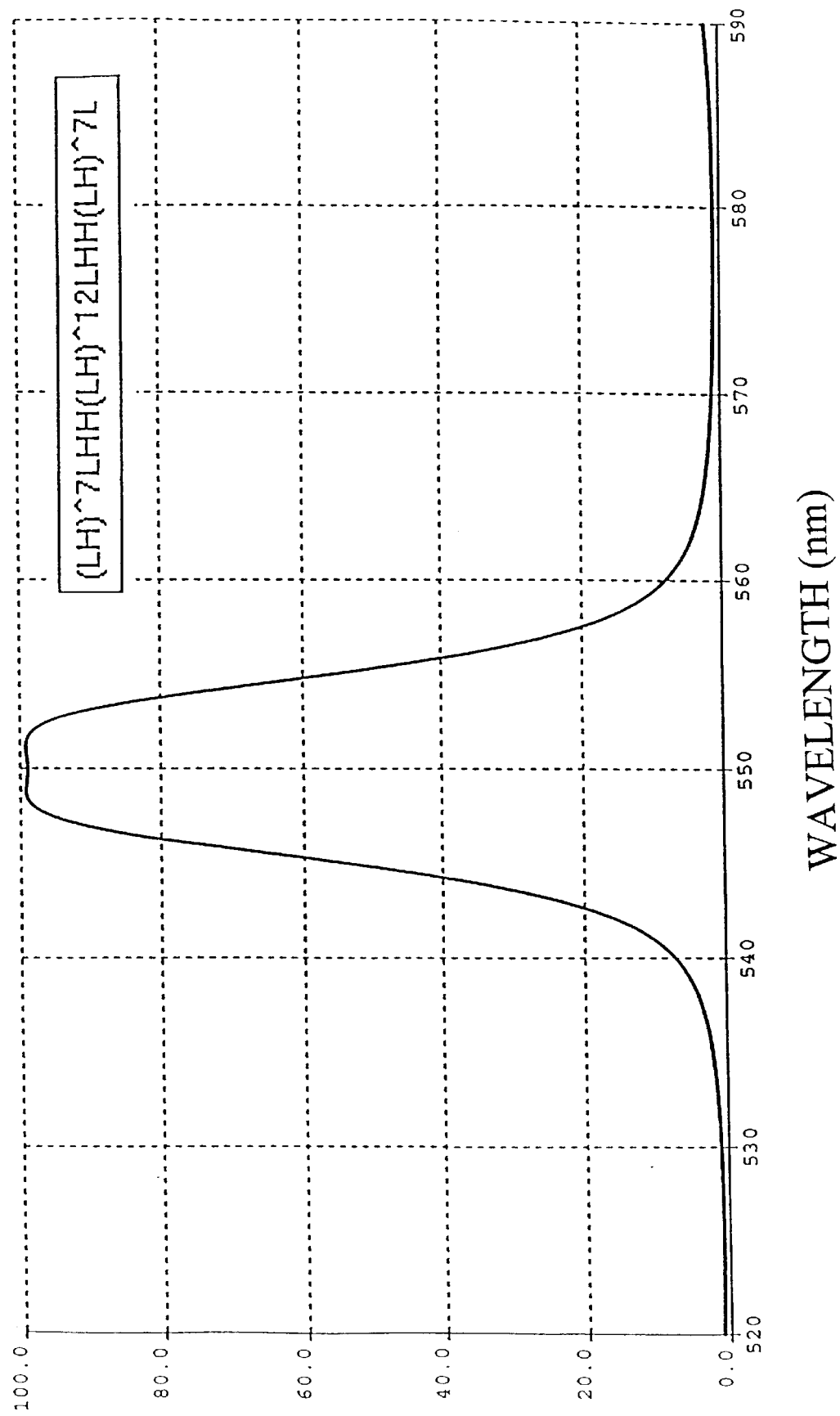
Figure 8:
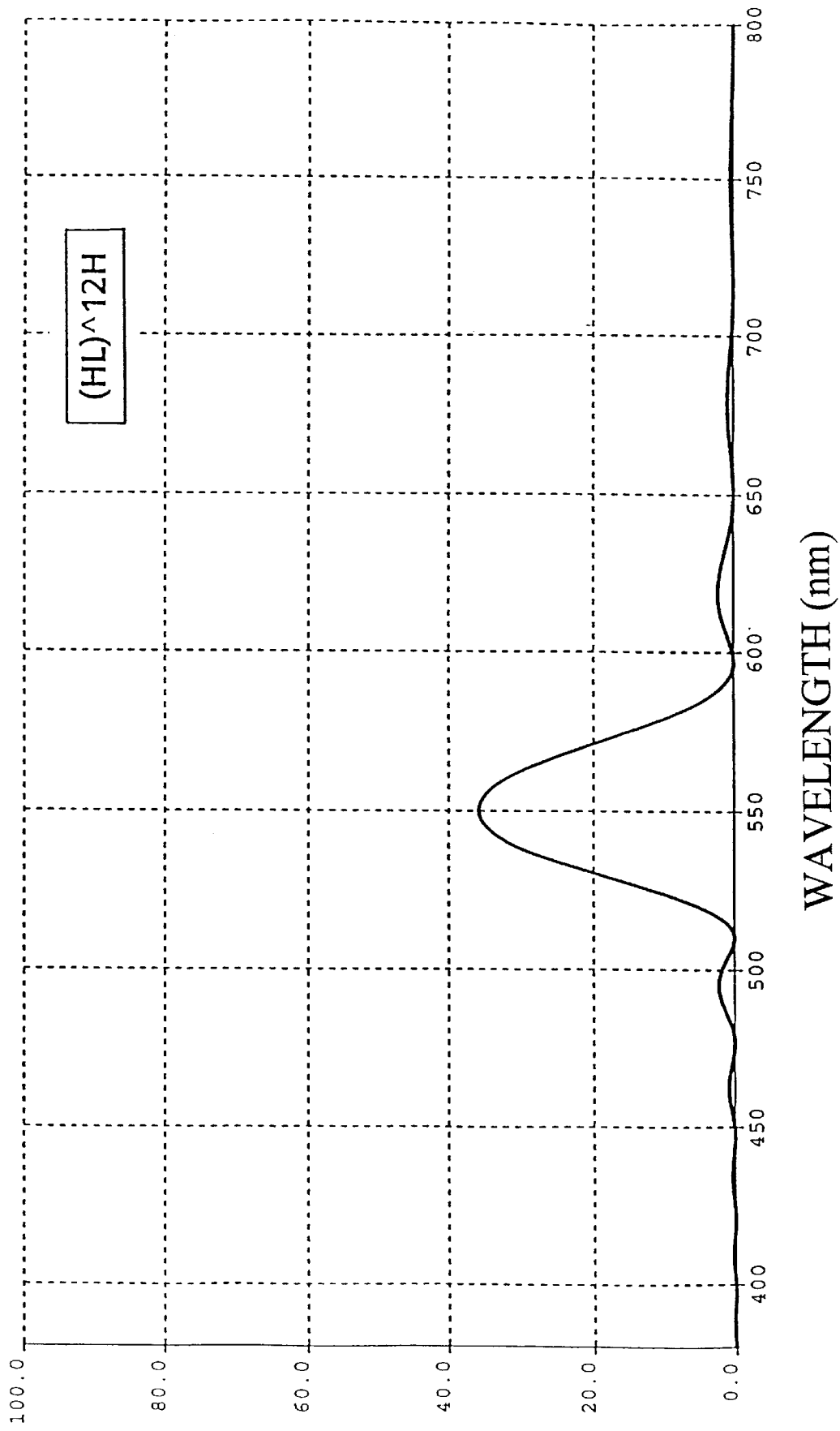

BRIEF DESCRIPTION OF THE SEVERAL VIEWS OF THE DRAWING(S):

The invented process is made more apparent in the following using several preferred embodiments with reference to the drawings. Shown is in:

FIG. 1 a diagrammatic exploded view of an embodiment of a device for drawing a preform according to the present invention;

FIG. 2 a sectional view of the embodiment of FIG. 1;

FIG. 3 a diagrammatic exploded view of another embodiment of a device for drawing preforms according to the present invention;

FIG. 4 a sectional view of the embodiment of FIG. 3;

FIG. 5 a first embodiment for the spectral properties (here: reflection) of a sequence of interference layers producible according to the present invention;

FIG. 6 a second embodiment for the spectral properties (here: reflection) of a sequence of interference layers producible according to the present invention;

FIG. 7 a third embodiment for the spectral properties (here: transmission) of a sequence of interference layers producible according to the present invention; and FIG. 8 a fourth embodiment for the spectral properties (here: reflection) of a sequence of interference layers producible according to the present invention.

Figure 9:
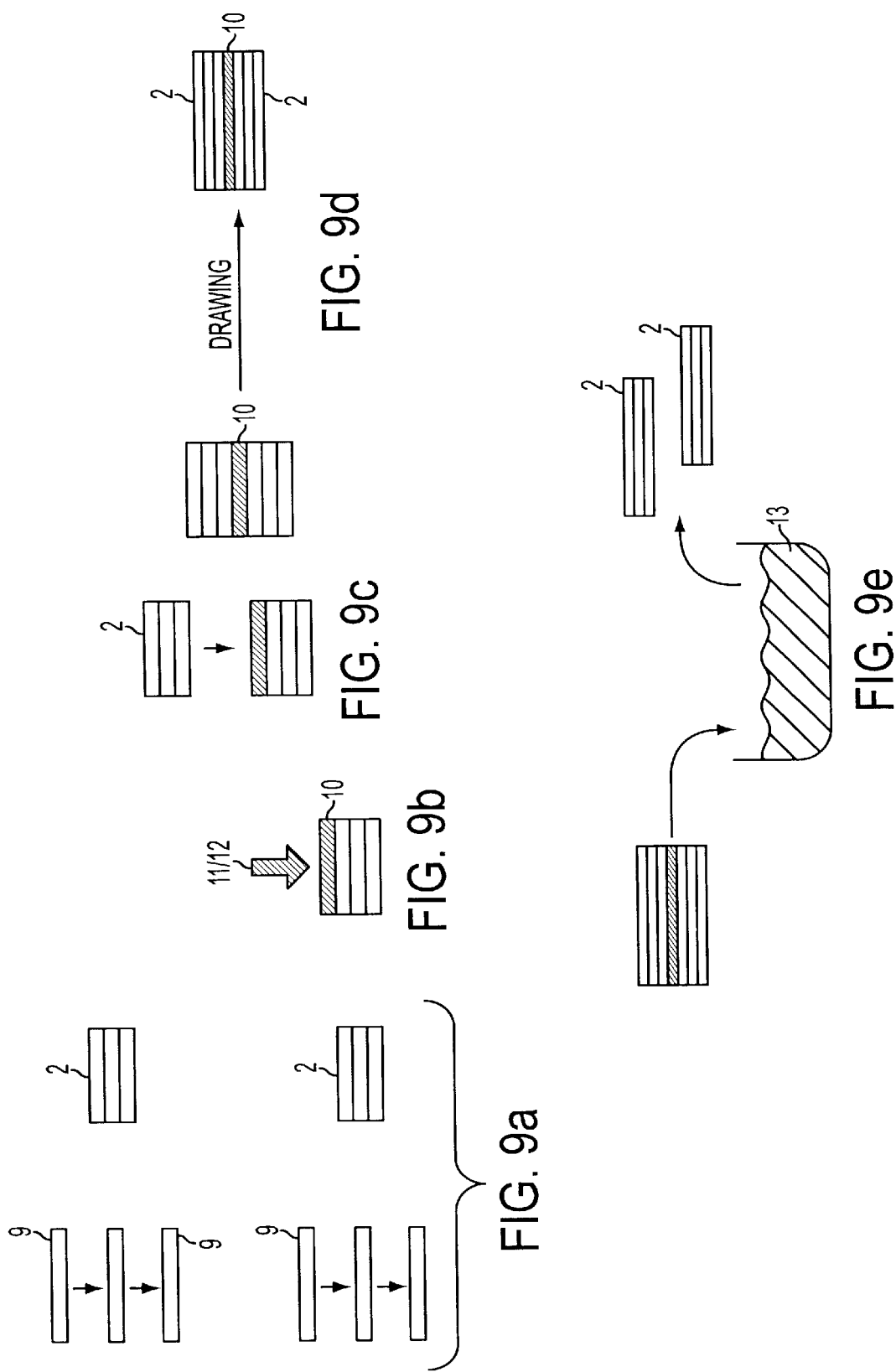
Figure 10:
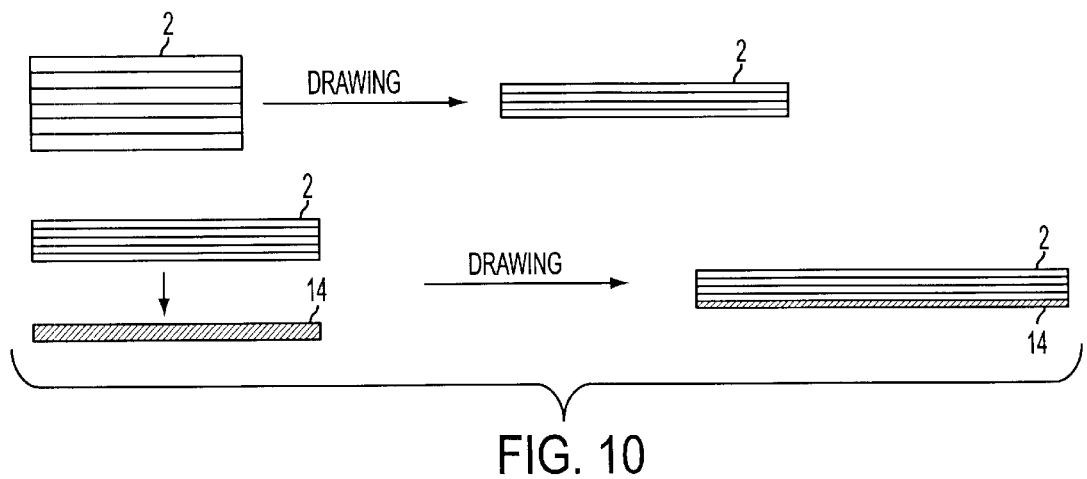
Figure 11:
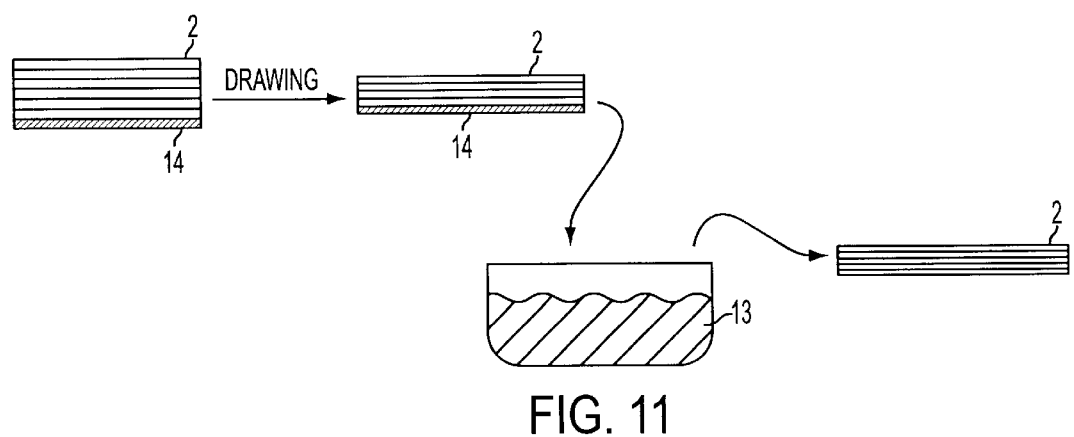
Figure 12:
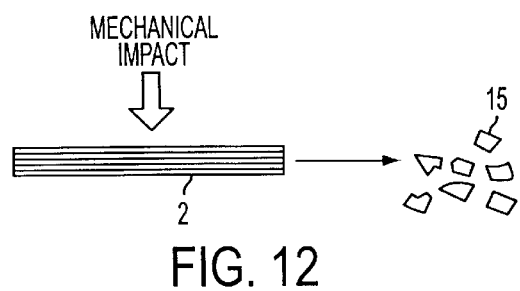

FIG. 9 shows the provision of two stacks 2 of glass plates by placing single glass plates 9 on top of one another (1); on one of the stacks a soluble layer 10 of thermoplastic material is applied using powder technology 11 or by means of a screen printing process 12 (b); the two stacks are placed on each other with the soluble layer 10 between (intermediate layer) (c); the drawing step is carried out (d); said intermediate layer 10 is dissolved in a solvent 13 (e);

FIG. 10 shows a process in which the drawing is performed in two drawing steps. In a first drawing step the stack 2 is drawn to a certain thickness; then the drawn stack is applied onto a carrier plate 14 made of a thermoplastic material; finally, the new stack undergoes a further drawing step with said carrier plate 14;

FIG. 11 shows the provision of a stack 2 on a carrier plate 14 made of a soluble material; the stack 2 is drawn with this carrier plate 14; then said carrier plate 14 is dissolved in a solvent 13 after cooling;

FIG. 12 shown the drawn stack 2 being mechanically separated into single particles 15 after cooling;

FIG. 13a shows the stack being drawn with the drawing velocity varied in steps; and FIG. 13b shows the drawing stack being drawn with the drawing velocity varied continuously.

DETAILED DESCRIPTION OF THE INVENTION

In the following depicted first, third and fourth preferred embodiments, single glass plates of defined thickness and refractive index are placed on top of each other and firmly melted together in a furnace. In the second preferred embodiment, glass layers are applied to both sides of a glass plate by means of screen printing. The resulting preform is then thermally drawn to thin interference-layer ribbons.

FIG. 1 shows a diagrammatic exploded view of an embodiment of a device for drawing such a type of preform 1 (in FIG. 2 a sectional view). Preform 1 comprises a stack of single glass plates, as shown in cross section 2. It is conducted through a drawing furnace 3 in which it is heated to a temperature above the transformation temperature of the glasses employed. Arrow 4 indicates the follow-up. Preform 1 is drawn to the desired ribbon thickness via a deflection roll 6 by means of a drawing device 5. The follow-up velocity and the drawing velocity are tuned to each other in such a manner that this thickness is exactly attained.

The depicted case is a discontinuous drawing process, because after one preform has been drawn, the next one has to be inserted into the device before the drawing procedure can be resumed.

Melting together the single preforms arranged successively in the drawing direction prior to the drawing procedure also permits a continuous drawing process so that no technical or economically unfavorable pauses occur. An embodiment of this is shown in the exploded view of FIG. 3 (FIG. 4 a sectional view). Three individual preforms 1A, 1B and 1C are connected to each other by means of a melting device 7 before passing through the drawing furnace 3. The preform cross section 2 with the single glass plates is shown. In this case, the follow-up occurs by means of press rollers 8. The drawing device 5 is designed as a roller machine.

If very thin starting glass plates are used, commercially available up to thicknesses of 0.03 mm, the preform is drawn in one step 1000 times (i.e. by a factor of 1000 with respect to the thickness) to the end thickness of 30 nm per interference layer.

Based on the preform having glass plates of 1 mm thickness, the preform has to be drawn about 10000 times for the layer thicknesses to be approximately 100 nm. Interference filters with an optical effect in the visible spectral range usually possess such layer thicknesses.

However, this cannot be achieved in a single drawing step but rather in this case preferably double or triple drawing steps are conducted. After each drawing step, the drawn ribbon can be separated into suited sections which are placed on a respectively thicker carrier glass plate and are then drawn along with it. Another possibility comprises placing many sections of the first drawing step on top of each other and subject them to further drawing steps in order to create layer systems with very many layers.

In systems with very many layers composed of a recurring sequence of layers, one can draw one preform composed of a single sequence or a multiple thereof to a ribbon that is wound in several layers on a drum. The multi-layer coat is removed, cut up, laid plane and forms a new preform that is drawn to the end-sized interference layer system.

In order to produce single interference particles, e.g. mother-of-pearl pigments, the drawn ribbon-shaped interference system is cut up into single particles.

For applications requiring only layer packages without a substrate, it is advantageous to select for the carrier glass of the preform, in the final drawing step, a type of glass that can be dissolved in a further step (e.g. water-soluble), or a plastic, for example teflon. Of course, a carrier glass is not always required, but rather only serves to facilitate handling if the layer packages are very thin.

However, several layer packages can be also be joined with readily soluble intermediate layers to produce a preform. After the drawing procedure, these readily soluble intermediate layers are dissolved in such a manner that several single interference systems based on the several layer packages are provided. The layer system can also be applied to one side of a glass-like base plate or to one side of a glass-plastic laminate.

Another variant of the process comprises melting single layer packages onto a carrier glass plate transverse to the drawing direction. Drawing this preform yields a ribbon of many adjacently disposed interference systems, which can be utilized as interference filters.

Graded interference filters are filters in which the layer thicknesses of all the layers of the filter increase or decrease in one direction (in the plane of the layers of the filter). Usually a linear course is selected for the variation in layer thickness. The spectral characteristic of the filter changes with the site along the thickness gradient, because it is a function of the layer thicknesses. Interference line filters possessing such thickness gradients can be employed as simple monochromators. For this purpose, the preform can be deformed in a wedge-shaped manner transverse to the drawing direction. Subsequently, a wedge-shaped counterpiece is added as the carrier glass of the preform in order to obtain once again a uniformly thick preform. Various cross section profiles perpendicular to the drawing direction, e.g., wave-shaped, can be employed. After the drawing process, the cross section profile remains congruent and the layer sequence is retained.

In the following, preferred embodiments of the production of interference layer systems for preferred applications are described. To produce preforms, glass plates with an alternating high (H) and low refraction index (L) are melted together. The different interference layer systems are built up symmetrically. High-refractive-index glass plates always form the outer border.

Drawing these preforms always occurs in such a manner that λ/4 interference layers are created, with, by way of example, the effective wavelength being λ=550 nm.

The first embodiment shows the production of an interference system for use as an effect filter (e.g., mother-of-pearl pigments, metal glaze pigments). For the basic package of 15 glass plates, SF11 (Schott glass) with a refractive index of $n_d$=1.7847 is used as the high-refractive-index glass (H) and D263 (DESAG) with $n_d$=1.5231 is used as the low-refractive-index glass (L). First the following layer package of 15 glass plates is produced: HLHLHLHLHLHLHLH. The thickness of the high-refractive-index glass SF11 (H) is 0.085 mm and of the low-refractive-index glass D263 (L) 0.1 mm. This plate package is composed of 7 L and 8 H plates and has an overall thickness of 1.38 mm. Four such layer packages each separated by a readily acid-soluble separation glass (here: borosilicate glass) are employed to make the preform, resulting in the following arrangement:

| | |
|---|---|
| Layer package | 1.38 mm |
| Separation glass | 1 mm |
| Layer package | 1.38 mm |
| Separation glass | 1 mm |
| Layer package | 1.38 mm |
| Separation glass | 1 mm |
| Layer package | 1.38 mm |

This arrangement is placed on top of each other four times; each time separated by a separation glass. The resulting preform is composed of a total of 16 layer packages and 15 separation glasses with an overall layer thickness of 37.08 mm. The starting width of the preform is 50 mm and the starting length 90 mm. Due to the discontinuous drawing process in the longitudinal direction at about 700° C., the glass plates melt together and the preform is drawn 1107.665 times to an overall thickness of 33.5 µm.

Then the yielded glass ribbon is mechanically cut up into small pieces and separated into individual interference filters by dissolving the separation glasses. Each filter possesses a thickness of 1.248 µm and a width of 45.14 µm. The individual layer thicknesses of the glasses is 77.04 nm for the H glass SF 11 and 90.28 nm for the L glass D263. The interference filter respectively pigments have a high reflection at 550 nm with reflection values above 70%. This is indicated in FIG. 3 showing, for the produced sequence of interference layers, the dependence of the degree of refraction on the wavelength.

The second embodiment also shows the production of an interference system for use as an effect filter (mother-of-pearl pigments, metal glaze pigments) like in the first embodiment. Different from the first embodiment, a very high reflection should be obtained in the blue spectral range. Like in the first embodiment, glass D263 serves as the low-refractive-index layer. The starting thicknesses are also 0.1 mm. The high-refractive-index glass SF11 is applied onto these plates in a suited thickness by means of screen printing. Advantageous is that with the screen printing process it is easy to obtain different layer thicknesses (thickness of the screen thread). The width of a reflection band can be increased in this manner. Two interference layer systems of different layer thickness, whose reflection bands overlap, are placed on top of each other. If the required expansion is distinctly less than 50%, it suffices only to alter the high-refractive-index or low-refractive index layer in order to shift the reflection band.

The interference system is composed of 41 layers:

10 times SF11 with d=85.34 $\mu$m on D263 with d=100 $\mu$m 10 times SF11 with d=96.785 $\mu$m on D263 with d=100 $\mu$m 1 time SF11 with d=96.785 $\mu$m (i.e. the last D263-plates have to be covered with SF11 on both sides).

The overall package has a thickness of 3918 $\mu$m=3.918 mm.

Eight such packages separated by a 1 mm thick separation glass layer are joined to produce a preform. The width of the preform is 50 mm and the length 90 mm. Like in the first embodiment, the individual plates of the preform are melted together. Then the preform is drawn 1350.80 times.

Following this, like in the first embodiment, the resulting glass ribbon is mechanically cut into small pieces and separated into individual interference filters by dissolving the separation glasses. FIG. 6 shows the reflection as the function of the wavelength. The high reflection in the blue spectral range is evident.

The third embodiment shows the production of an interference layer system for use as a line filter. The filter should measure macroscopically approximately 2 cm×2 cm in order to filter out in various optical applications the desired wavelength from a mixture of wavelengths, such as radiation sources usually possess. In this embodiment, the central wavelength $\lambda$=550 nm is selected. The filter-is composed of 59 high-refractive index and low-refractive-index layers. The selected line filter buildup was the so-called "two cavity" type line filter with the following layer sequence: (LH) $_7$LHH(LH) $_{12}$LHH(LH) $_7$L. L stands for a low-refractive-index layer of D263 glass ($n_d$=1.5231) with the optical layer thickness n.d=550/4 nm. H stands for a high-refractive-index layer of glass SF11 ($n_d$=1.7847) with the optical layer thickness n.d=550/4 nm.

The preform is drawn in three steps 10.347 times in each step, corresponding to a total multiplying factor of 1107.7. The low-refractive-index glass plates of the preform are 0.1 mm thick, the high-refractive-index glass plates are 0.08534 mm thick.

In the first step, the 59 plates of the preform are placed on a 10 mm thick D263 carrier glass plate and together are drawn 10.347 times. The starting thickness of the preform, and the carrier glass is 15.45 mm, the width is set at 300 mm. After the first drawing procedure, strips of 300 mm length are cut and placed on a D263 carrier glass (300 mm×290 mm) in such a manner that they are disposed transverse to the drawing direction of the second drawing procedure, 10 strips of 28.99 mm width on a 1 mm thick carrier glass. In the second step, this "new" preform is also drawn 10.347 times. Like after the first drawing procedure, 300 mm long strips are cut and again placed on a D263 carrier glass transverse to the drawing direction of the third drawing procedure. The carrier glass is 10 mm thick and has a width of 300 mm and a length of 290 mm.

After the third drawing procedure by the same multiplying factor, a 28.99 mm wide ribbon with the described interference layer system on an approximately 1 mm thick D263 carrier glass is provided. From this the desired filters are cut off and to the desired end size. The spectral properties of such filters are shown in FIG. 7 as the degree of transmission in dependence on the wavelength. However, it must be noted that after production, the "seams" of the laid strips must be discarded.

The fourth embodiment shows the production of an interference system for use as interference particles (flakes) for counterfeit-safe products, such as for example bank notes, documents or lacquers. The single preforms of so-called security flakes comprise layer packages composed of 25 glass plates. Used are high-refractive-index BaF4 glass (Schott glass) with a refractive index of $n_d$=1.60562 (H) and a thickness of 0.09486 mm and low-refractive-index D263 glass (L) with a thickness of 0.1 mm. These glasses are stacked alternately according to the following pattern: (HL)$_{12}$H. The 12 L glass plates have an overall thickness of 1.2 mm and the H glasses of 1.23318 mm. The overall thickness of the single layer packages is 2.433 mm. 10 of these single layers systems respectively preforms are placed on top of each other separated by a 1 mm thick soluble separation glass (a total of 9 separation glasses). The overall thickness of the end preform is 33.33 mm, the width 75 mm and the length 25 mm. The preform is drawn 1107.665 times to the end thickness of 30.1 $\mu$m and the end width of 67.7 $\mu$m by means of a discontinuous drawing process in the longitudinal direction at 750° C. After mechanically cutting up into small pieces and dissolving the separation glasses, the end thickness of the L glass is 90.28 nm and of the H glass is 85.64 nm. These security interference flakes have a defined reflection at 550 nm with reflection values of more than 35%, as FIG. 8 shows.

What is claimed is:

1. A process for the production of an article selected from the group consisting of interference filters, interference pigments and interference particles having sequences of interference layers composed of layers i of prescribed thicknesses d(i) and refractive indices n(i), comprising the steps of:

providing a stack of glass plates having plane surfaces, the stack comprised of at least two layers i of glasses having refractive indices n(i) and thicknesses $d_0$(i), which are each larger than the prescribed thicknesses d(i) by the same multiplying factor;

heating the stack to a temperature above the transformation temperature of the glasses of the layers;

applying the stack onto a carrier plate composed of a thermoplastic material which is soluble, and wherein the stack and the carrier plate are drawn together;

drawing the stack during or after heating in such a manner that the respective layers obtain the prescribed thicknesses d(i);

cooling of the drawn stack; and dissolving the carrier plate in a solvent after cooling.

2. The process according to claim 1, wherein the stack is drawn at a drawing velocity, and wherein the prescribed thicknesses d(i) are set by the drawing velocity.

3. The process according to claim 2, wherein the drawing velocity during drawing is one of (A) varied in steps or (B) varied continuously in such a manner that one of (A) interference layer sequences of varying thicknesses are produced from a single stack or (B) a sequence of graded interference layers are produced from a single stack.

4. The process according to claim 1, wherein drawing takes place in a plurality of discontinuous steps.

5. The process according to claim 1, further comprising mechanically separating the drawn stack into one of single particles or sections after cooling.

6. The process according to claim 4, wherein applying the stack onto a carrier plate composed of a thermoplastic material takes place between two steps, and wherein the remaining steps take place with the stack applied to the carrier plate.

* * * * *